US008559958B2

(12) United States Patent
Lee et al.

(10) Patent No.: US 8,559,958 B2
(45) Date of Patent: Oct. 15, 2013

(54) METHODS AND APPARATUS FOR HANDOVER BETWEEN MACRO BASE STATION AND HOME BASE STATION

(75) Inventors: Jun-Kyoung Lee, Seoul (KR); Chae-Man Lim, Seoul (KR); Young-Hak Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 742 days.

(21) Appl. No.: 12/627,908

(22) Filed: Nov. 30, 2009

(65) Prior Publication Data

US 2011/0130138 A1    Jun. 2, 2011

(51) Int. Cl.
*H04W 36/00* (2009.01)
(52) U.S. Cl.
USPC ............................................ 455/438; 455/436
(58) Field of Classification Search
USPC ................. 455/436–448, 426.1, 422.1, 450, 455/456.1–456.3, 456.5–456.6; 370/331, 370/328, 338
See application file for complete search history.

(56) References Cited

U.S. PATENT DOCUMENTS

| | | | |
|---|---|---|---|
| 6,208,631 B1 * | 3/2001 | Kim | 370/332 |
| 6,947,405 B2 * | 9/2005 | Pitcher et al. | 370/338 |
| 2003/0114169 A1 * | 6/2003 | Okamura et al. | 455/456 |
| 2006/0126564 A1 * | 6/2006 | Ramanna et al. | 370/331 |
| 2006/0270411 A1 * | 11/2006 | Grayson | 455/444 |
| 2006/0270477 A1 * | 11/2006 | Snow | 463/11 |
| 2007/0202866 A1 * | 8/2007 | Tsuchiya | 455/422.1 |
| 2009/0047960 A1 * | 2/2009 | Gunnarsson et al. | 455/436 |
| 2009/0092097 A1 * | 4/2009 | Nylander et al. | 370/331 |
| 2009/0129341 A1 * | 5/2009 | Balasubramanian et al. | 370/331 |
| 2009/0264134 A1 * | 10/2009 | Xu et al. | 455/437 |
| 2009/0270111 A1 * | 10/2009 | Nakamura et al. | 455/456.1 |
| 2010/0054208 A1 * | 3/2010 | Kojima | 370/331 |
| 2010/0120438 A1 * | 5/2010 | Kone et al. | 455/444 |
| 2010/0124931 A1 * | 5/2010 | Eskicioglu et al. | 455/440 |
| 2010/0260141 A1 * | 10/2010 | Chowdhury et al. | 370/331 |
| 2011/0190003 A1 * | 8/2011 | Hiltunen et al. | 455/452.1 |
| 2011/0244861 A1 * | 10/2011 | Gurusamy et al. | 455/436 |
| 2012/0100861 A1 * | 4/2012 | Zhang et al. | 455/444 |

FOREIGN PATENT DOCUMENTS

KR    1020090008055    1/2009

* cited by examiner

*Primary Examiner* — Brandon Miller
(74) *Attorney, Agent, or Firm* — The Farrell Law Firm, P.C.

(57) ABSTRACT

Methods and apparatus are provided for performing a handover from a macro base station to a home node in the macro base station of a mobile communications system. A location of a terminal is received from the terminal at the macro base station. A handover from the macro base station to the home node to which the terminal is registered is initiated, when a distance between the location of the terminal and a location of the home node is less than a first predefined threshold. A request for an allocation of frequency and resources having a minimum interference with the macro base station for the home node is transmitted to a home node controller.

11 Claims, 5 Drawing Sheets

METHODS AND APPARATUS FOR HANDOVER BETWEEN MACRO BASE STATION AND HOME BASE STATION

BACKGROUND OF THE INVENTION

1. Field of the Invention

The present invention relates generally to Long Term Evolution (LTE)-Advanced mobile communication systems, and more particularly, to a handover between a macro base station and a home base station in LTE-Advanced mobile communication systems.

2. Description of the Related Art

LTE-Advanced mobile communication systems incorporate the use of a Home Node B (HNB), which acts as a femto cell and is optimized for deployment in a home. Through the use of HNBs in LTE-Advanced systems, network capacity and performance are expected to significantly increase. However, the incorporation of HNBs in a system currently requires the use of a complicated network protocol, because each HNB is used in a manner similar to that of a base station. Thus, technological advancements are required that enable handovers to HNBs in the LTE-Advanced system.

Conventionally, a terminal requests a handover from a macro base station to an HNB, after the terminal compares a receiving power of the macro base station to a receiving power of the HNB.

An HNB performs the same function as a macro base station, but on a smaller scale. Thus, an unregistered terminal in close proximity to an HNB may experience greater interference when communicating with its own HNB or the macro base station. For example, when each cell controls its own power and a receiving power of a registered terminal decreases, the HNB is able to increase its transmitting power. However, by increasing transmitting power, interference with unregistered terminals in close proximity to the HNB also increases, thereby negatively affecting the performance of the macro base station.

An HNB may be installed in each house, resulting in a large number of HNBs that are in close proximity, e.g., in a crowded neighborhood or an apartment complex. Therefore, when a terminal is moving it may experience a large number of handovers. The increased number of handovers results in increased processing and signaling in the network, thereby decreasing network throughput.

Further, when a terminal performs its own searches for registration and handover to HNBs, processing performance of the terminal decreases due to the frequent measurement and management that is required.

SUMMARY OF THE INVENTION

The present invention has been made to address at least the above problems and/or disadvantages and to provide at least the advantages described below. Accordingly, an aspect of the present invention provides methods and apparatus for performing a handover between a macro base station and an HNB in an LIE-Advanced mobile communication system.

According to one aspect of the present invention, a method is provided for device registration in a mobile telecommunications system. Terminal information is provided from a terminal to a home node for registration of the terminal with the home node. The terminal information and home node information are provided from the home node to a home node controller. The terminal information and the home node information are provided from the home node controller to a macro base station.

According to another aspect of the present invention, a method is provided for performing a handover from a macro base station to a home node in the macro base station of a mobile telecommunications system. A location of a terminal is received from the terminal at the macro base station. A handover from the macro base station to the home node to which the terminal is registered is initiated when a distance between the location of the terminal and a location of the home node is less than a first predefined threshold.

According to an additional aspect of the present invention, a method is provided for performing a handover from a macro base station to a home node in a home node controller of a mobile telecommunications system. A request for an allocation of frequency and resources having a minimum interference with the macro base station for the home node is received from the macro base station. Allocated frequency and resource information for the home node are transmitted to the home node and the macro base station, and a command to initialize operation of the home node is transmitted to the home node for handover from the macro base station to the home node.

According to another aspect of the present invention, a method is provided for performing a handover from a home node to a macro base station in the macro base station of a mobile telecommunications system. Handover from the home node to the macro base station is initiated. A location of a terminal is received from the terminal at the macro base station. A command to turn off the home node is transmitted from the macro base station to a home node controller when a distance between the location of the home terminal and a location of the home node is greater than a predefined threshold.

Additionally, according to a further aspect of the present invention, a macro base station in a mobile telecommunications system is provided. The macro base station includes a receiver for receiving a location of a terminal from the terminal. The macro base station also includes a controller for initiating a handover from the macro base station to a home node to which the terminal is registered when a distance between the location of the terminal and a location of the home node is less than a predefined threshold.

According to another aspect of the present invention, a home node controller in a mobile telecommunications system is provided. The home node controller includes a receiver for receiving, from a macro base station, a request for an allocation of frequency and resources having minimum interference with the macro base station for a home node. The home node controller also includes a transmitter for transmitting allocated frequency and resource information for the home node to the home node and the macro base station, and for transmitting a command to initialize operation of the home node for handover from the macro base station to the home node.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE PRESENT INVENTION

Figure 1:
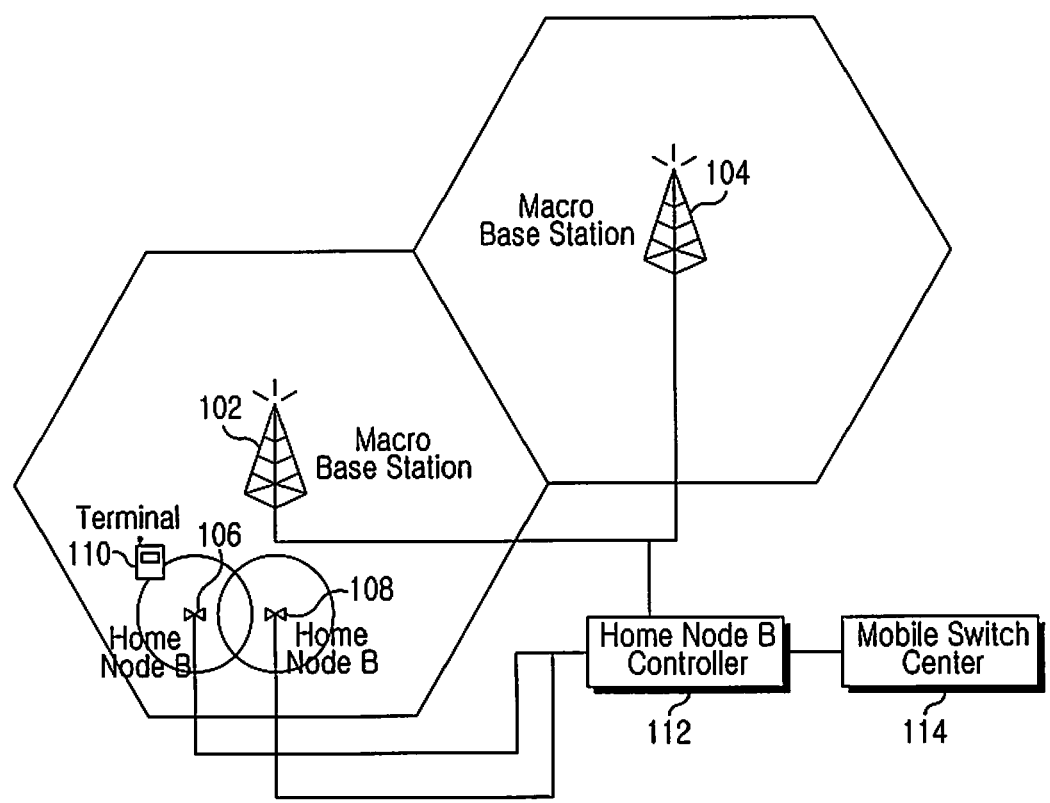
FIG. 1 is a diagram illustrating a configuration of elements of an LTE-Advanced mobile communication system, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustrative purposes only and not for the purpose of limiting the invention. Accordingly, the present invention should be defined by the appended claims and their equivalents.

It is to be understood that the singular forms "a," "an," and "the" include plural referents unless the context clearly dictates otherwise. Thus, for example, reference to "an identifier" includes reference to one or more of such identifiers.

Referring initially to FIG. 1, a diagram illustrates a configuration of elements of an LTE-Advanced mobile communication system, according to an embodiment of the present invention. Specifically, FIG. 1 illustrates a first macro base station 102, a second macro base station 104, a first HNB 106, a second HNB 108, a terminal 110, an HNB controller 112, and a mobile switching center 114.

The first and second macro base stations, 102 and 104, each perform wireless communication in their own macro cell. The first and second HNBs, 106 and 108, each perform wireless communication with their respective registered terminals. The first and second HNBs, 106 and 108, each have a respective area defined by their respective transmitting/receiving signal power. The terminal 110 is capable of determining its own location and is capable of communicating with the first and second macro base stations, 102 and 104, and HNBs to which it is registered. As illustrated in FIG. 1, the terminal 110 is located within a macro cell of the first macro base station 102 and within an area of the first HNB 106.

The HNB controller 112 is connected with the first and second macro base stations, 102 and 104, and the first and second HNBs, 106 and 108. The HNB controller 112 determines an operational status of each of the first and second HNBs, 106 and 108. The HNB controller 112 also allocates a frequency and resources to an operational HNB and acts as a mediator between the operational HNB and the mobile switching center 114. In FIG. 1 the HNB controller 112 is shown separate from the first and second macro base stations, 102 and 104. However, in alternate embodiments of the present invention, the HNB controller 112 may be located in other areas, e.g., within a macro base station. The mobile switching center 114 enables the exchange of data between terminals.

Figure 2:
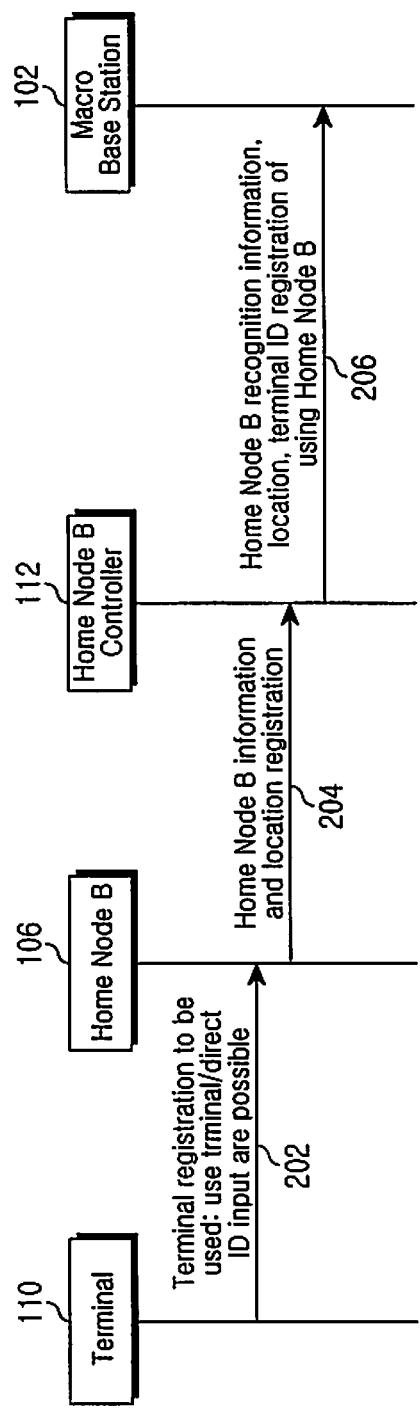
FIG. 2 is a diagram illustrating registration procedures in an LTE-Advanced mobile communication system including an HNB, according to an embodiment of the present invention.

Referring to FIG. 2, a diagram illustrates registration procedures in an LTE-Advanced mobile communication system having an HNB, according to an embodiment of the present invention.

In step 202, the terminal 110 is registered with the first HNB 106. This registration may be performed via direct input, or via terminal signaling using, for example, an International Mobile Equipment Identity (IMEI), a Mobile Station Identifier (MSID), and/or a phone number that is unique to the terminal 110. In step 204, the first HNB 106 registers HNB information and terminal information with the HNB controller 112, which may be wired to the first HNB 106. The HNB information may include, for example, location information and device information. The terminal information may include a terminal ID as described above. In step 206, the HNB controller 112 registers the HNB information and the terminal information with the macro base station 102.

Figure 3:
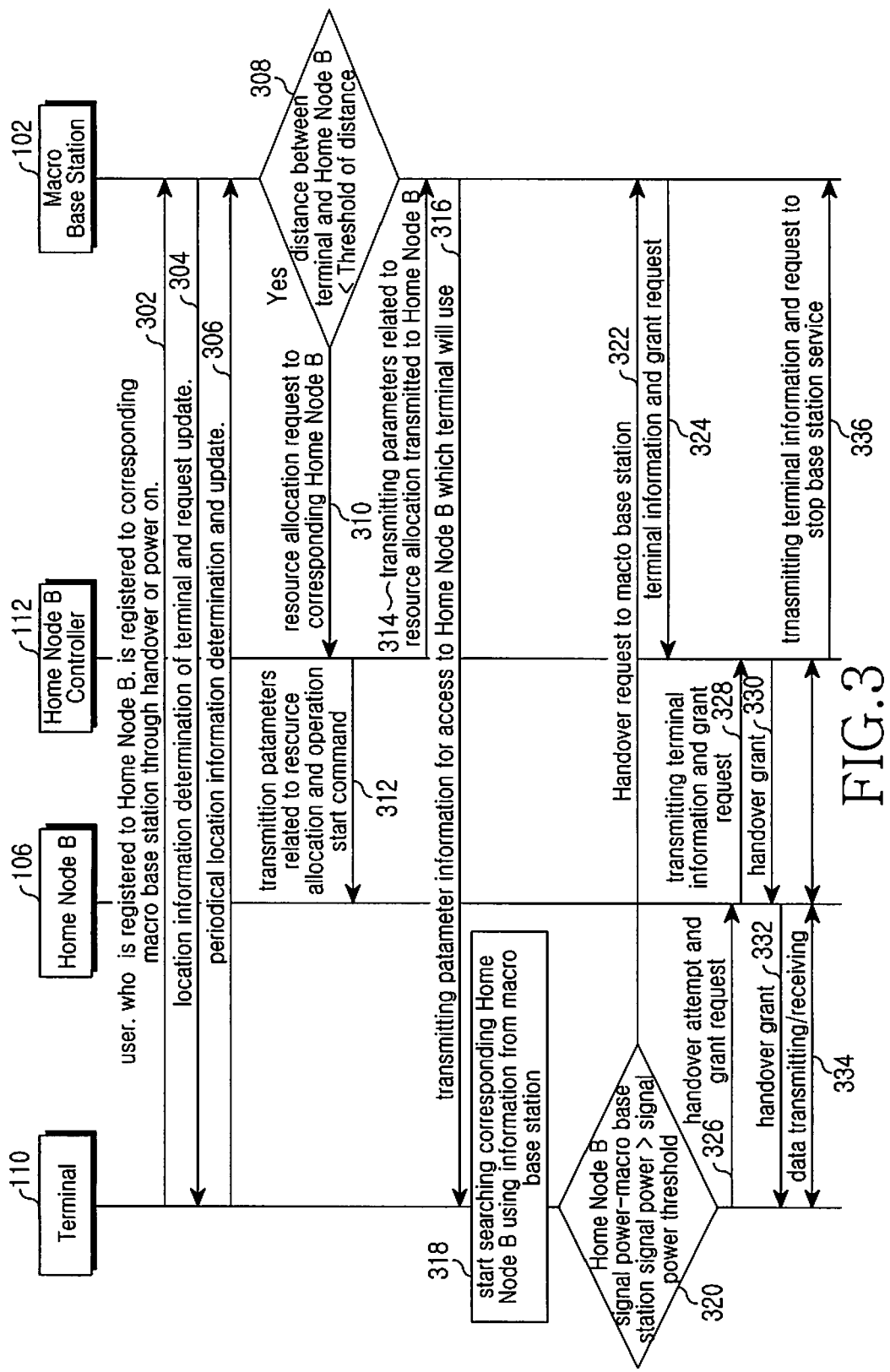
FIG. 3 is a diagram illustrating a handover procedure from a macro base station to an HNB, according to an embodiment of the present invention.

Referring now to FIG. 3, a diagram illustrates a handover procedure from a macro base station to an HNB, according to an embodiment of the present invention. The procedure begins in step 302 when the terminal 110, which is registered for service with the first HNB 106, is registered in the macro base station 102 through a power on procedure or a previous handover. In step 304, the macro base station 102 transmits a request to determine and report a terminal location to the terminal 110. In step 306, the terminal 110 determines its location and periodically notifies the macro base station 102 of its location.

In step 308, the macro base station 102 determines whether a distance between the location of the terminal 102 and a location of the HNB 106 is less than a first predefined threshold. The location of the first HNB 106 is provided to the macro base station 102 during registration as described above with respect to FIG. 2. When it is determined that the distance is less than the predefined threshold, the macro base station 102 sends a message to the HNB controller 112 requesting frequency and resource allocation for the first HNB 106 in step 310. The frequency and resources are allocated at the HNB controller 112 such that there is minimum interference with the macro base station 102. The HNB controller 112 uses HNB information received during registration in performing the allocation.

In step 312, the HNB controller 112 initiates operation of the first HNB 106 by commanding the first HNB 106 to power up for a possible handover, and transmits allocated frequency and resource information to the first HNB 106. In step 314, the HNB controller 112 also transmits the allocated frequency and resource information to the macro base station 102.

The macro base station 102 transmits the allocated frequency and resource information to the terminal 110, in step 316, and the terminal 110 begins a search for the first FMB 106 using the information received from the macro base station 102, in step 318. In step 320, the terminal 110 determines whether a signal power of the HNB 106 exceeds a signal power of the macro base station 102 by more than a second predefined threshold. When the difference exceeds the second predefined threshold, the terminal 110 sends a message to the macro base station 102 requesting handover to the first HNB 106 in step 322.

In step 324, the macro base station 102 grants handover of the terminal 110 to the HNB 106 and transmits terminal information and a handover grant request to the HNB controller 112. When the terminal attempts handover to the first HNB 106 in step 326, the first HNB 106 transmits a request for a handover grant that includes the terminal information to the HNB controller 112 in step 328. When the handover grant is received from the HNB controller 112 at the first HNB 106 and the terminal 110 in steps 330 and 332, the terminal 110 is handed over to the first HNB 106. The terminal 110 then begins communication with the HNB 106 in step 334, and the HNB controller 112 sends a command to the macro base station 102 that stops service between the terminal 110 and the macro base station 102 in step 336.

Figure 4:
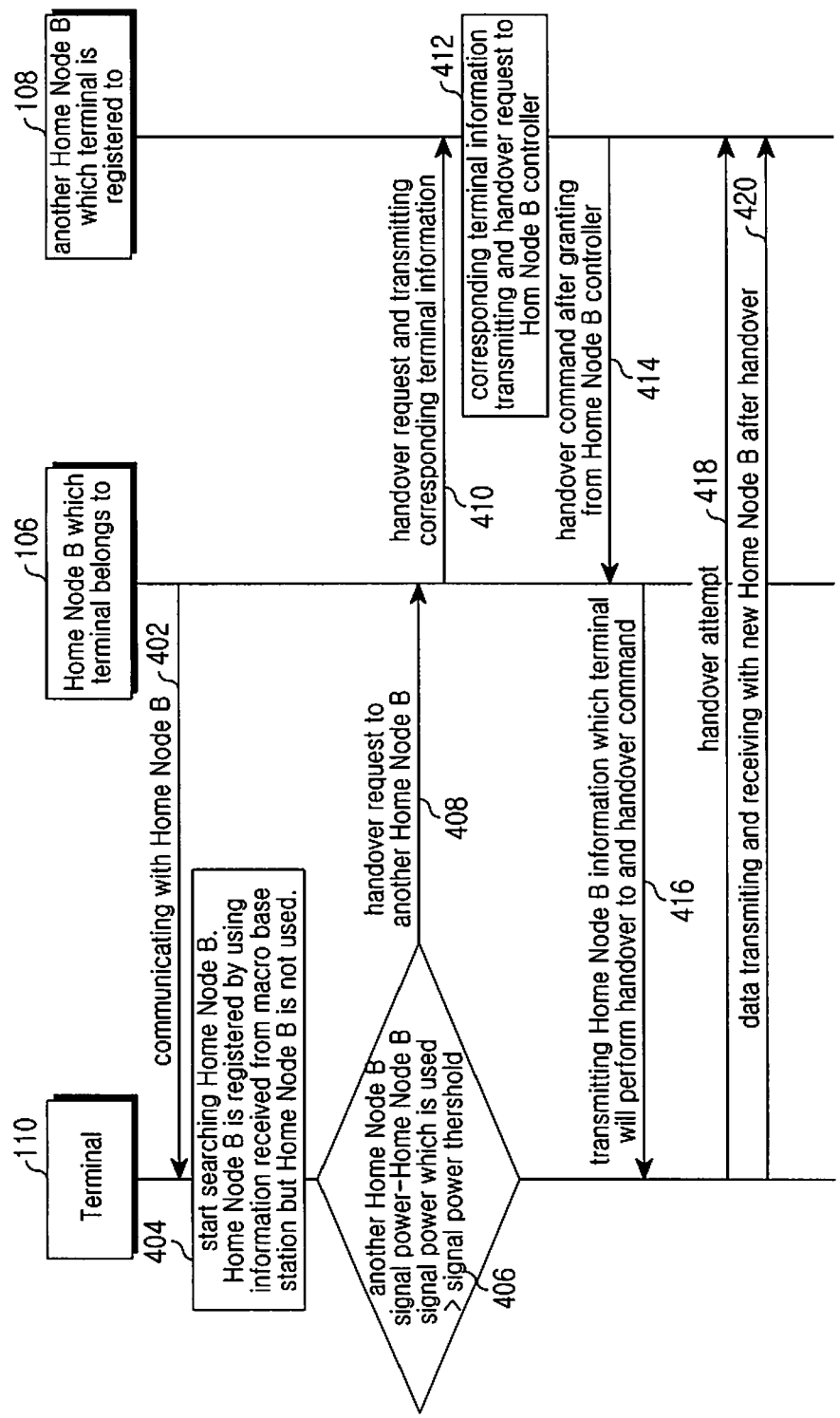
FIG. 4 is a diagram illustrating a handover procedure between HNBs in an LTE-Advanced mobile communication system, according to an embodiment of the present invention.

Referring now to FIG. 4, a diagram illustrates a handover procedure between HNBs in an LTE-Advanced mobile communication system, according to an embodiment of the present invention. A handover, as described in FIG. 4, takes place when the terminal 110 is registered for service with both the first HNB 106 and the second HNB 108. The first macro base station 102 provides all corresponding HNB information to the terminal 110, and the first HNB 106 and the second HNB 108 operate in accordance with allocated frequency and resource information received from the HNB controller 112.

More specifically, in step 402, the terminal 110 is communicating with the first HNB 106. In step 404, the terminal 110 searches for signals from other HNBs to which the terminal 110 is registered, using information received from the macro base station 102. The first HNB 106 is not involved in the search for other HNBs. In step 406, when the second HNB 108 is found, the terminal 110 determines whether a signal strength of the second HNB 108 exceeds a signal strength of the first HNB 106 by more than a predefined threshold. When the difference is greater than the predefined threshold, the terminal 110 sends a message to the first HNB 106 requesting a handover to the second HNB 108, in step 408. The first HNB 106 sends a handover request and terminal information to the second HNB 108, in step 410.

The second HNB 108 transmits the terminal information to the HNB controller 112 in step 412. The HNB controller 112 grants the handover.

After being granted the handover by the HNB controller 112, the second HNB 108 transmits a handover command to the first HNB 106 in step 414. In step 416, the first HNB 106 transmits information of the second HNB 108 and a handover command to the terminal 110. The terminal attempts a handover to the second HNB 108 in step 418, and when the handover is complete, the terminal 110 communicates with the second HNB 108 in step 420.

Figure 5:
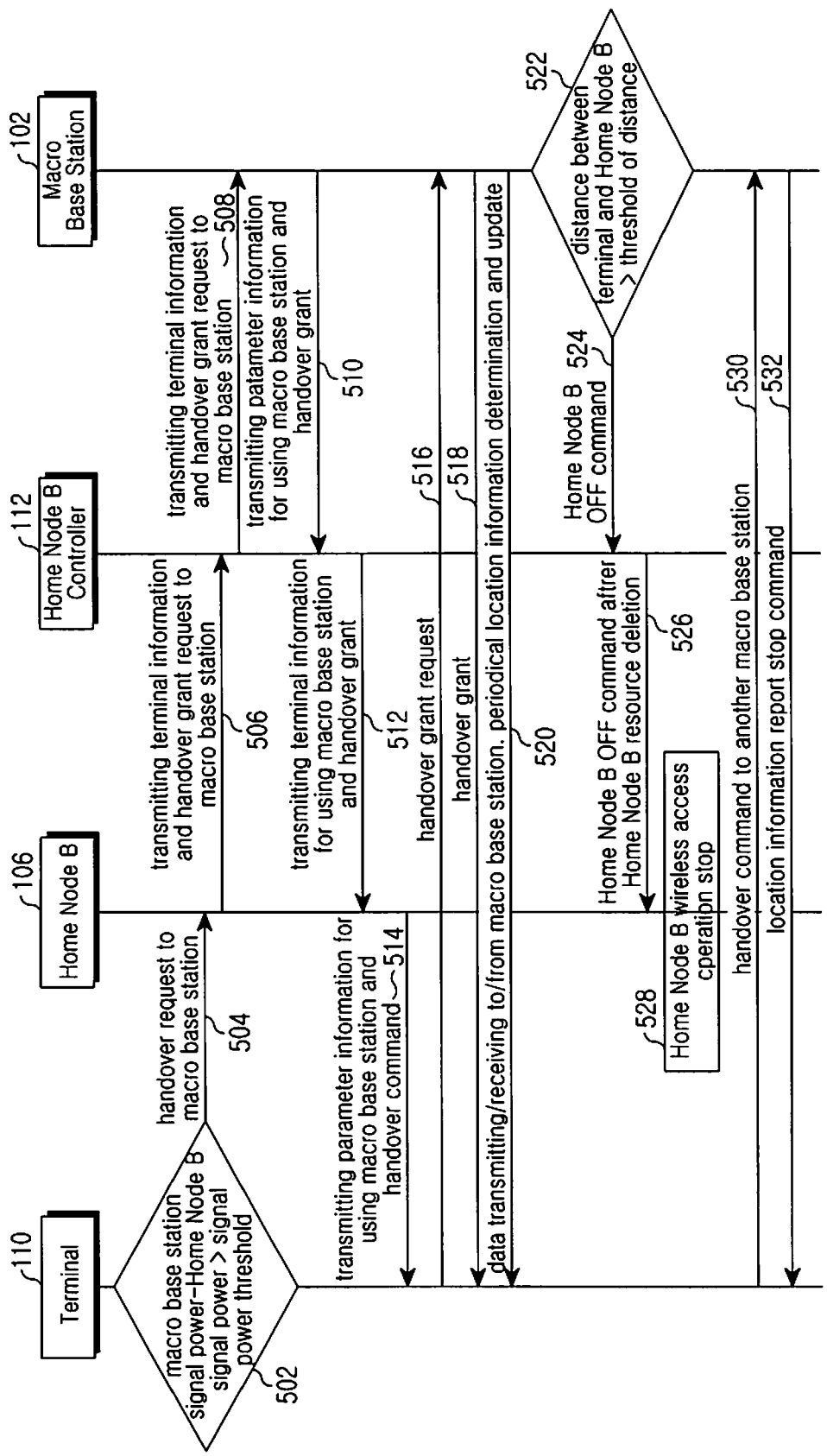
FIG. 5 is a diagram illustrating a handover procedure from an HNB to a macro base station, according to an embodiment of the present invention.

Referring now to FIG. 5, a diagram illustrates a handover procedure from an HNB to a macro base station, according to an embodiment of the present invention.

In step 502, the terminal 110 determines whether a signal strength of the macro base station 102 exceeds a signal strength of the first HNB 106 by more than a first predefined threshold. If the difference is greater than the first predefined threshold, the terminal 110 transmits a message to the first HNB 106 requesting a handover to the macro base station 102, in step 504. In step 506, the first HNB 106 transmits terminal information and a handover grant request to the HNB controller 112. The HNB controller 112 transmits the terminal information and the handover grant request to the macro base station 102, in step 508.

The macro base station 102 transmits parameter information for using the macro base station 102 and a handover grant to the HNB controller 112 in step 510. In step 512, the parameter information for using the macro base station 102 and the handover grant are transmitted from the HNB controller 112 to the first HNB 106. In step 514, the parameter information for using the macro base station 102 and a handover command are transmitted from the first HNB 106 to the terminal 110.

Thereafter, the terminal 110 performs the handover to the macro base station 102 using the parameter information received from the first HNB 106. Specifically, the terminal 110 transmits the handover grant request to the macro base station 102 in step 516, and the macro base station 102 transmits the handover grant to the terminal 110 in step 518. The terminal 110 and the macro base station 102 are then in communication in step 520. While in communication, the terminal 110 periodically determines and transmits its location to the macro base station 102.

In step 522, the macro base station 102 determines whether a distance between the terminal 110 and the first HNB 106 is greater than a second predefined threshold. When the distance is greater than the second predefined threshold, the macro base station 102 transmits an off command for the first HNB 106 to the HNB controller 112 in step 524. In step 526, the HNB controller 112 transmits an off command to the first HNB 106, and deletes the resource allocation of the first HNB 106 in the HNB controller 112. In step 528, the first HNB 106 ceases operation. In step 530, when the terminal 110 sends a message to the macro base station 102 requesting handover to another macro base station 104, the macro base station 102 transmits a command to the terminal 110 to stop reporting its location in step 532.

Although the macro base station 102 transmits an off command for the first HNB 106 to the HNB controller 112, which then transmits the off command to the first HNB 106, when the distance between the terminal 110 and the first HNB 106 is greater than the second predefined threshold, in FIG. 5, in accordance with another embodiment of the present invention, it is also possible for the macro base station 102 to transmit an off command for the first HNB 106, any time after transmitting the handover grant, without waiting for the terminal 110 to move a certain distance away from the first HNB 106.

Additionally, it is also possible for the macro base station 102 to transmit an off command for the first HNB 106, after a lapse of a predetermined time from transmitting the handover grant.

With respect to the above-described embodiments of the present invention, when a service between an HNB and a terminal begins, the HNB commands the terminal to turn off its power control and to provide periodic Carrier-to-Interference and Noise Ratio (CINR) reports. The HNB determines a transmitting power via resources allocated from the HNB controller and transmits terminal transmitting power information to the terminal.

In accordance with an embodiment of the present invention, the terminal transmits data to and receives data from the HNB using a fixed power. Thus, the HNB determines a data transmitting ratio according the CINR and provides a requested service, while also minimizing interference with other terminals that are operating in cells of another HNB or the macro base station.

In accordance with an embodiment of the present invention, a terminal may perform a handover between a macro base station and an HNB without a connection drop.

Further, because the above-described embodiments of the present invention use location information of the terminal, transmit power waste is prevented and resource use is minimized.

Additionally, when a terminal is registered to several HNBs, in accordance with an embodiment of the present invention, data communication is maintained through the handover between HNBs.

In accordance with an embodiment of the present invention, all HNBs and the terminal use determined and fixed transmitting powers, such that power is not controlled by the HNB. Accordingly, transmitting capabilities of entire cells are improved by minimizing a terminal's interference with a macro base station or another HNB.

While the present invention has been shown and described with reference to certain embodiments thereof, it will be understood by those skilled in the art that various changes in form and detail may be made therein without departing from the spirit and scope of the present invention as defined by the appended claims and their equivalents.

What is claimed is:

1. A method for performing a handover from a macro base station to a home node by the macro base station of a mobile communications system, comprising the steps of:
   receiving, by the macro base station, a location of a terminal from the terminal;
   initiating a handover from the macro base station to the home node to which the terminal is registered, when a distance between the location of the terminal and a location of the home node is less than a first predefined threshold; and
   receiving, by the macro base station, a request to stop macro base station service from a home node controller, after a successful handover to the home node,
   wherein initiating the handover comprises:
   sending an allocation request to the home node controller, when the distance between the location of the terminal and the location of the home node is less than the first predefined threshold;
   receiving allocated frequency and resource information for the home node from the home node controller; and
   transmitting the allocated frequency and resource information for the home node from the macro base station to the terminal,
   wherein the location of the terminal is received periodically by the macro base station.

2. The method of claim 1, further comprising:
   detecting the terminal in a cell of the macro base station; and
   requesting, by the macro base station, that the terminal determine the location of the terminal and report the location of the terminal.

3. The method of claim 1, wherein initiating the handover comprises:
   receiving, by the macro base station, a request for the handover to the home node from the terminal, when a signal power of the home node exceeds a signal power of the macro base station by more than a second predefined threshold; and
   transmitting terminal information and a handover grant request to a home node controller.

4. The method of claim 1, further comprising receiving, by the macro base station, terminal information from the home node controller, after the successful handover to the home node.

5. A method for performing a handover from a macro base station to a home node by a home node controller of a mobile communications system, comprising the steps of:
   receiving, by the home node controller, a request for an allocation of frequency and resources for the home node from the macro base station;
   transmitting allocated frequency and resource information for the home node to the home node and the macro base station;
   transmitting a command to initialize operation of the home node to the home node;
   receiving terminal information and a first handover grant request from the macro base station;
   receiving the terminal information and a second handover grant request from the home node; and
   transmitting a handover grant to the home node.

6. The method of claim 5, further comprising transmitting terminal information and a request to stop macro base station service to the macro base station, after a successful handover to the home node.

7. A method for performing a handover from a home node to a macro base station by the macro base station of a mobile communications system, comprising the steps of:
   initiating, by the macro base station, a handover from the home node to the macro base station;
   receiving a location of a terminal from the terminal; and
   transmitting a command to turn off the home node from the macro base station to a home node controller, when a distance between the location of the terminal and a location of the home node is greater than a first predefined threshold.

8. The method of claim 7, wherein the handover is initiated, when a signal power of the macro base station exceeds a signal power of the home node by more than a second predefined threshold.

9. The method of claim 7, further comprising:
   receiving a request to handover to another macro base station from the terminal; and
   transmitting a command to the terminal to stop transmission of its location.

10. A macro base station in a mobile communications system, comprising:
    a receiver for periodically receiving a location of a terminal from the terminal, and receiving a request to stop macro base station service from a home node controller, after a successful handover to a home node; and
    a controller for initiating a handover from the macro base station to the home node to which the terminal is registered, when a distance between the location of the terminal and a location of the home node is less than a predefined threshold,
    wherein initiating the handover comprises:
    sending an allocation request to the home node controller, when the distance between the location of the terminal and the location of the home node is less than the first predefined threshold;
    receiving allocated frequency and resource information for the home node from the home node controller; and
    transmitting the allocated frequency and resource information for the home node from the macro base station to the terminal.

11. A home node controller in a mobile communications system, comprising:
    a receiver for receiving, from a macro base station, a request for an allocation of frequency and resources having minimum interference with the macro base station for a home node, receiving terminal information and a first handover grant request from the macro base station, and receiving the terminal information and a second handover grant request from the home node; and
    a transmitter for transmitting allocated frequency and resource information for the home node to the home node and the macro base station, for transmitting a command to initialize operation of the home node for a handover from the macro base station to the home node, and for transmitting a handover grant to the home node.

* * * * *